US008225139B2

(12) United States Patent
Nussbaum et al.

(10) Patent No.: US 8,225,139 B2
(45) Date of Patent: Jul. 17, 2012

(54) FACILITATING TRANSACTIONAL EXECUTION THROUGH FEEDBACK ABOUT MISSPECULATION

(75) Inventors: Daniel S. Nussbaum, Cambridge, MA (US); David Dice, Foxboro, MA (US); Martin Karlsson, San Francisco, CA (US); Mark S. Moir, Hampton, NH (US)

(73) Assignee: Oracle America, Inc., Redwood Shores, CA (US)

(*) Notice: Subject to any disclaimer, the term of this patent is extended or adjusted under 35 U.S.C. 154(b) by 441 days.

(21) Appl. No.: 12/493,447

(22) Filed: Jun. 29, 2009

(65) Prior Publication Data

US 2010/0333093 A1 Dec. 30, 2010

(51) Int. Cl.
*G06F 9/00* (2006.01)
(52) U.S. Cl. ............................................. 714/16; 714/15
(58) Field of Classification Search ...................... 714/16
See application file for complete search history.

(56) References Cited

U.S. PATENT DOCUMENTS

| | | | | |
|---|---|---|---|---|
| 7,739,456 B1* | 6/2010 | Cypher et al. | ................ | 711/145 |
| 2006/0112261 A1* | 5/2006 | Yourst et al. | ................ | 712/218 |
| 2007/0074006 A1* | 3/2007 | Martinez et al. | ................ | 712/218 |
| 2007/0136289 A1* | 6/2007 | Adl-Tabatabai et al. | ......... | 707/8 |
| 2007/0143287 A1* | 6/2007 | Adl-tabatabai et al. | .......... | 707/8 |
| 2007/0143550 A1* | 6/2007 | Rajwar et al. | ................. | 711/146 |
| 2007/0143755 A1* | 6/2007 | Sahu et al. | .................... | 718/100 |
| 2007/0156780 A1* | 7/2007 | Saha et al. | .................... | 707/202 |
| 2008/0010532 A1* | 1/2008 | Lev et al. | ........................ | 714/35 |
| 2008/0148262 A1* | 6/2008 | Dice | ............................. | 718/101 |
| 2008/0244544 A1* | 10/2008 | Neelakantam et al. | ....... | 717/147 |
| 2009/0007070 A1* | 1/2009 | Magruder et al. | ............ | 717/120 |
| 2009/0125519 A1* | 5/2009 | Robison et al. | ................... | 707/8 |
| 2009/0217018 A1* | 8/2009 | Abrashkevich et al. | ...... | 712/244 |
| 2009/0217020 A1* | 8/2009 | Yourst | ........................... | 712/245 |

\* cited by examiner

*Primary Examiner* — Scott Baderman
*Assistant Examiner* — Chae Ko
(74) *Attorney, Agent, or Firm* — Park, Vaughan, Fleming & Dowler LLP; Chia-Hsin Suen (57) ABSTRACT

One embodiment provides a system that facilitates the execution of a transaction for a program in a hardware-supported transactional memory system. During operation, the system records a misspeculation indicator of the transaction during execution of the transaction using hardware transactional memory mechanisms. Next, the system detects a transaction failure associated with the transaction. Finally, the system provides the recorded misspeculation indicator to the program to facilitate a response to the transaction failure by the program.

20 Claims, 4 Drawing Sheets

FACILITATING TRANSACTIONAL EXECUTION THROUGH FEEDBACK ABOUT MISSPECULATION

BACKGROUND

1. Field

The present embodiments relate to techniques for improving performance within computer systems. More specifically, the present embodiments relate to a method and system for providing feedback about transactions in a transactional memory system that fail due to misspeculation.

2. Related Art

Computer system designers are presently developing mechanisms to support multi-threading within the latest generation of Chip-Multiprocessors (CMPs) as well as more traditional Shared Memory Multiprocessors (SMPs). With proper hardware support, multi-threading can dramatically increase computational performance. However, as microprocessor performance continues to increase, the time spent synchronizing between threads (processes) is becoming a large fraction of overall execution time. In fact, as multi-threaded applications begin to use even more threads, this synchronization overhead often becomes the dominant factor in limiting application performance.

From a programmer's perspective, synchronization is typically accomplished through the use of locks. A lock is usually acquired before a thread enters a critical section of code, and is released after the thread exits the critical section. If another thread wants to enter a critical section protected by the same lock, it must acquire the same lock. If it is unable to acquire the lock, because a preceding thread has acquired the lock, the thread must wait until the preceding thread releases the lock. (Note that a lock can be implemented in a number of ways, such as through atomic operations or semaphores.)

Unfortunately, the process of acquiring a lock and the process of releasing a lock can be very time-consuming in modern microprocessors. They typically involve atomic operations, which flush load and store buffers, and can consequently require hundreds, if not thousands, of processor cycles to complete.

Moreover, as multi-threaded applications use more threads, more locks are required. For example, if multiple threads need to access a shared data structure, it is often impractical for performance reasons to use a single lock for the entire data structure. Instead, it is preferable to use multiple fine-grained locks to lock small portions of the data structure. This allows multiple threads to operate on different portions of the data structure in parallel. However, it may also require a single thread to acquire and release multiple locks in order to access different portions of the data structure. It also introduces other concerns, such as avoiding deadlock.

To reduce overhead involved in lock-based execution of critical sections, a critical section may be transactionally executed. In particular, changes made during transactional execution of the critical section may not be committed to the architectural state of the processor until the transactional execution successfully completes. Furthermore, the transactional execution may be carried out using "best effort" transactional execution mechanisms that do not prevent architecture-specific limitations of the processor from failing transactions.

Mechanisms for supporting hardware transactional memory have a lot in common with mechanisms used for speculation. For example, a processor may perform a load, which results in a cache miss. Rather than simply waiting for the load to complete, the processor may continue executing subsequent instructions until the result of the load miss is needed. Even if the result of the load miss is needed (e.g., the value from the load is needed to determine the outcome of a branch instruction), the processor may be able to continue execution. Rather than waiting for the load to complete, the processor may assume that the branch is correctly predicted, and continue executing with that assumption.

Unfortunately, failures in transactional and/or speculative execution may be difficult to diagnose. For example, a failed transaction may be caused by a conflicting memory access or an architecture-specific limitation of the processor on which the transaction is executing. In addition, the optimal response to failed transactional and/or speculative execution may depend on the cause(s) of the failed execution. For example, a transaction failure that occurs due to a conflicting memory access or misspeculation may be remedied by retrying the transaction, while a transaction failure caused by an instruction that is not supported by "best effort" transactional execution mechanisms may require bypassing using an alternative code path.

Hence, what is needed is a mechanism for facilitating the diagnosis of and response to failures associated with "best effort" transactional execution and/or speculative execution.

SUMMARY

One embodiment provides a system that facilitates the execution of a transaction for a program in a hardware-supported transactional memory system. During operation, the system records a misspeculation indicator of the transaction during execution of the transaction using hardware transactional memory mechanisms. Next, the system detects a transaction failure associated with the transaction. Finally, the system provides the recorded misspeculation indicator to the program to facilitate a response to the transaction failure by the program.

In some embodiments, the misspeculation indicator is used by the program to retry the transaction if the misspeculation indicator corresponds to a possible misspeculation associated with the transaction, and perform a remedial action if the misspeculation indicator corresponds to an occurrence of the transaction failure without misspeculating.

In some embodiments, the remedial action involves at least one of retrying the transaction, addressing a source of the transaction failure, and using an alternative code path to bypass the transaction failure.

In some embodiments, the source of the transaction failure corresponds to at least one of a trap instruction, an unsupported instruction, a precise exception, an asynchronous interrupt, an exceeded queue size, an evicted cache line, a floating point operation, and a translation lookaside buffer (TLB) miss.

In some embodiments, the alternative code path involves executing the transaction using software transactional execution mechanisms.

In some embodiments, the alternative code path involves executing a critical section while holding a lock.

In some embodiments, the possible misspeculation is associated with at least one of a value prediction, an address prediction, and a branch prediction.

In some embodiments, the misspeculation indicator is recorded as a misspeculation bit in a checkpoint status register associated with the program.

In some embodiments, the misspeculation bit is set if a predicted branch is executed during execution of the transaction.

In some embodiments, the misspeculation bit is subsequently cleared if the predicted branch is correctly predicted.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

One or more embodiments provide a method and system for facilitating the execution of a transaction on a processor. The transaction may be part of a program that is executed within a hardware-supported transactional memory system. The transaction may also be supported using software transactional execution mechanisms. In other words, the transaction may be used as a concurrency control mechanism by enabling a group of instructions to execute atomically without the drawbacks of traditional lock-based synchronization.

More specifically, one or more embodiments provide a method and system for providing feedback regarding misspeculation associated with a transaction and/or other software exposed speculation mechanism. The feedback may be provided by recording a misspeculation indicator of the transaction during execution of the transaction. If the transaction fails, the misspeculation indicator is provided to the program to enable the program to respond to the transaction failure. The misspeculation indicator may be recorded as a misspeculation bit in a register associated with the program; the misspeculation bit is set if an instruction is executed based on a prediction made during the transaction due to the unavailability of required information (e.g., an unresolved cache miss). The misspeculation bit may also be cleared if the transaction is retried after the cache miss is resolved and/or if the branch is correctly predicted. As a result, the misspeculation bit may allow the program to respond accordingly to a transaction failure based on the possibility of a misspeculation causing the transaction failure.

Figure 1:
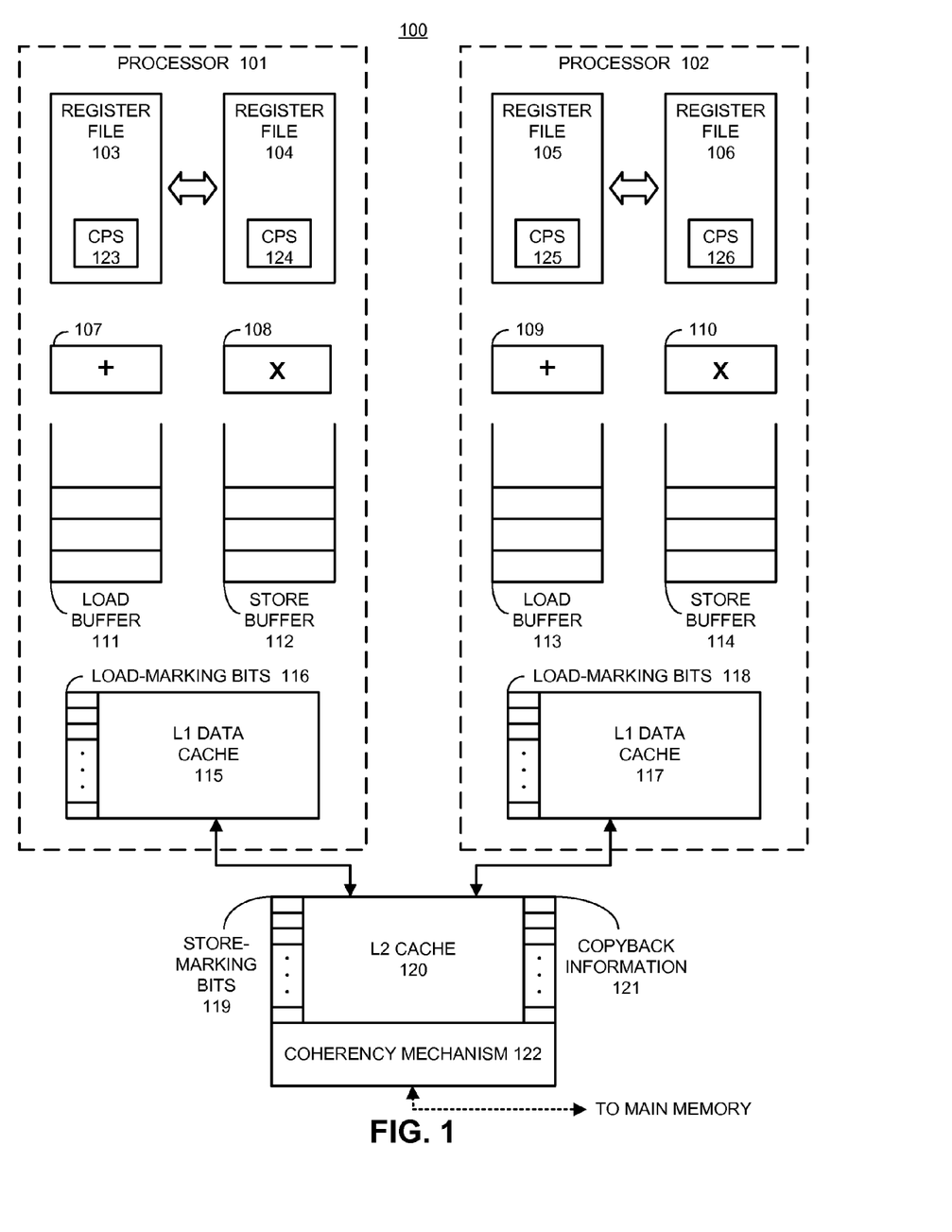
FIG. 1 shows a computer system in accordance with an embodiment.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance. As shown in FIG. 1, computer system 100 includes processors 101-102 and level 2 (L2) cache 120, which is coupled to main memory (not shown). Processors 101-102 may be used to execute a program on computer system 100 as a sequence of instructions. Processor 102 is similar in structure to processor 101, so only processor 101 is described below.

Processor 101 has two register files 103 and 104, one of which is an "active register file" and the other of which is a backup "shadow register file." In one embodiment of the present invention, processor 101 provides a flash copy operation that instantly copies all of the values from register file 103 into register file 104. This facilitates a rapid register checkpointing operation to support transactional execution of a program on processor 101.

Processor 101 also includes one or more functional units, such as adder 107 and multiplier 108. These functional units are used in performing computational operations involving operands retrieved from register files 103 or 104. As in a conventional processor, load and store operations pass through load buffer 111 and store buffer 112.

Processor 101 additionally includes a level one (L1) data cache 115, which stores data items that are likely to be used by processor 101. Note that lines in L1 data cache 115 include load-marking bits 116, which indicate that a data value from the line has been loaded during transactional execution. These load-marking bits 116 are used to determine whether any interfering memory references take place during execution of a transaction. Processor 101 also includes an L1 instruction cache (not shown).

Note that load-marking does not necessarily have to take place in L1 data cache 115. In general load-marking can take place at any level cache, such as L2 cache 120, or even in an independent structure. However, for performance reasons, the load-marking will likely take place at the cache level that is as close to the processor as possible, which in this case is L1 data cache 115. Otherwise, loads would have to go to L2 cache 120 even on an L1 hit.

L2 cache 120 operates in concert with L1 data cache 115 (and a corresponding L1 instruction cache) in processor 101, and with L1 data cache 117 (and a corresponding L1 instruction cache) in processor 102. Note that L2 cache 120 is associated with a coherency mechanism 122, such as the reverse directory structure described in U.S. patent application Ser. No. 10/186,118, entitled, "Method and Apparatus for Facilitating Speculative Loads in a Multiprocessor System," filed on Jun. 26, 2002, by inventors Shailender Chaudhry and Marc Tremblay (Publication No. US-2002-0199066-A1). This coherency mechanism 122 maintains "copyback information" 121 for each cache line. This copyback information 121 facilitates sending a cache line from L2 cache 120 to a requesting processor in cases where a cache line must be sent to another processor.

Each line in L2 cache 120 includes a "store-marking bit," which indicates that a data value has been stored to the line during transactional execution. This store-marking bit is used to determine whether any interfering memory references take place during transactional execution as is described below with reference to FIGS. 3-4. Note that store-marking does not necessarily have to take place in L2 cache 120.

Ideally, the store-marking takes place in the cache level closest to the processor where cache lines are coherent. For write-through L1 data caches, writes are automatically propagated to L2 cache 120. However, if an L1 data cache is a write-back cache, store-marking may be performed in the L1 data cache. Consequently, the cache coherence protocol may ensure that any other processor that subsequently modifies the same cache line will retrieve the cache line from the L1 cache, and will hence become aware of the store-mark. Alternatively, the subsequently modified cache line may simply cause the transactional execution to abort without notifying the other processor of the store-mark.

In one or more embodiments, the transactional execution mechanisms provided by processor 101 correspond to "best effort" transactional execution mechanisms. Such "best effort" transactional execution mechanisms may allow transactions to fail due to both conflicting memory accesses (e.g., interfering memory references) and architecture-specific limitations of processor 101. "Best effort" transactional execution using load-marking and store-marking is described further in U.S. Pat. No. 7,398,355 (issued Jul. 8, 2008) by inventors Mark S. Moir, Marc Tremblay and Shailender Chaudry, entitled "Avoiding Locks by Transactionally Executing Critical Sections," which is incorporated herein by reference. Transactional execution within computer system 100 is described further in U.S. Pat. No. 7,395,382 (issued Jul. 1, 2008) by inventor Mark S. Moir, entitled "Hybrid Software/Hardware Transactional Memory," which is incorporated herein by reference.

Furthermore, the "best effort" transactional execution mechanisms provided by processor 101 may be provided using alternative means. For example, processor 101 may provide hardware transactional mechanisms using signatures, tokens, metadata in memory (e.g., main memory), and/or metadata embedded in the memory system of computer system 100 (e.g., in parity bits).

The "best effort" transactional execution mechanisms associated with processor 101 may also be used to perform speculative execution of instructions. For example, processor 101 may be used to speculatively execute instructions during a high-latency event such as a cache miss. Furthermore, the various components of processors 101-102 may be used to ensure that effects of speculative execution are not observed until the speculative execution is determined to be correct. For example, speculative stores may be gated in store buffer 112 by processor 101 until the stores can be safely committed to memory. Processor 101 may revert to a previous checkpoint if values read during the speculative execution may have changed (e.g., the speculative execution may be incorrect), a resource (e.g., store buffer 112) on processor 101 is exhausted, and/or an exception or other uncommon event occurs during the speculative execution.

Those skilled in the art will appreciate that a variety of factors may cause a transaction to fail in a "best effort" execution of the transaction. For example, a transaction failure may be caused by a conflicting memory operation, a trap instruction, an unsupported instruction, a precise exception, an asynchronous interrupt, an exceeded queue size, an evicted cache line, a floating point operation, and/or a translation lookaside buffer (TLB) miss during the transaction.

The transaction may also fail due to misspeculation associated with speculative execution of the transaction. For example, processor 101 may perform branch prediction during the transaction following a cache miss on a load and execute a code path that is dependent on the outcome of the load. If the transaction fails during execution of the code path, the transaction may have failed because of an incorrectly predicted branch, value, and/or address (e.g., misspeculation); because of an interfering memory access; and/or because of a factor not supported by "best effort" transactional execution (e.g., asynchronous interrupt, TLB miss, unsupported instruction, etc.).

In addition, the program may be responsible for diagnosing and responding to transaction failures. To facilitate responses to transaction failures by the program, processors 101-102 may include functionality to execute transactions as specified by the program, as well as functionality to provide feedback regarding transaction failures to the program. As discussed below, the feedback may include information regarding the misspeculation indicator of the program during execution of the transaction. In other words, the feedback may allow the program to adequately respond to both transaction failures that occur due to possible misspeculation and transaction failures that occur for other reasons.

In one or more embodiments, transactional execution of instructions by processor 101 is specified by the program. For example, the program may use a "checkpoint" instruction to begin a transaction and a "commit" instruction to commit the transaction. The "checkpoint" instruction may additionally include a fail address to which control resumes if the transaction aborts (e.g., fails to commit). The program may additionally include one or more instructions for explicitly aborting the transaction.

As shown in FIG. 1, each register file 103-106 may include a checkpoint status (CPS) register 123-126. The CPS register may be used to provide feedback about the causes of a failed transaction. In particular, one or more bits in the CPS register may be set by a failing transaction to indicate one or more reasons as to why a transaction has failed. As a result, the CPS register may enable the program to react to transaction failures by providing information regarding the transaction failures to the program. The CPS register is described in further detail below with respect to FIG. 2.

In one or more embodiments, the CPS register includes a misspeculation bit that records a misspeculation indicator of a transaction during execution of the transaction on a processor 101-102. The misspeculation bit may be set if a possible misspeculation occurred during execution of the transaction. For example, the misspeculation bit may be set if a predicted branch instruction is executed when a value the branch instruction depends on is not yet available due to a cache miss. On the other hand, the misspeculation bit may not be set if no misspeculation is made during execution of the transaction. Moreover, the misspeculation bit may be subsequently cleared during execution of the transaction if the speculation is determined to have been correct (e.g., a branch is correctly predicted).

Upon encountering a transaction failure, the program may examine the misspeculation bit to determine if the transaction failure may have occurred due to misspeculation. If the misspeculation bit is set, the misspeculation indicator of the transaction may correspond to a possible misspeculation, and the program may retry the transaction one or more times because the previously missing data required to determine the correctness of the speculation may be available (e.g., in L1 data cache 115). The misspeculation bit may be cleared upon retrying the transaction (e.g., after a cache miss is resolved), and the transaction may succeed, suggesting that the transaction failure was caused by misspeculation.

However, if the transaction fails or continues to fail with the misspeculation bit cleared, the misspeculation indicator of the transaction may correspond to a transaction failure that has occurred in the absence of misspeculating. As a result, the program may perform a remedial action to attempt to correct the transaction failure. Furthermore, the remedial action may be based on one or more other bits in the CPS register that provide feedback regarding possible causes of the transaction failure. More specifically, the CPS register may contain bits that provide feedback regarding a failed transaction due to a conflicting memory operation, a trap instruction, an unsupported instruction, a precise exception, an asynchronous interrupt, an exceeded queue size, an evicted cache line, a floating point operation, and/or a TLB miss.

In particular, the program may retry the transaction immediately as the remedial action. For example, the transaction may be retried if the transaction failed due to a conflicting memory operation. Alternatively, the program may address a source of the transaction failure prior to retrying the transaction. In other words, the program may attempt to increase the transaction's chances of succeeding by reconfiguring one or more components of processor 101 and/or associated memory prior to retrying the transaction. For example, the program may attempt to correct a transaction failure caused by a TLB miss by causing a TLB mapping to the missing address to be generated prior to retrying the transaction.

Finally, the program may use an alternative code path to bypass the transaction failure if retries of the transaction failure are unlikely to succeed. For example, transactions that fail due to unsupported instructions, trap instructions, resource exhaustion, and/or other uncorrectable errors may require bypassing using alternative code paths. In one or more embodiments, alternative code paths used to bypass transaction failures are provided using software transactional execution mechanisms. For example, the program may use a software library instead of processor 101 to begin, execute, and commit transactions if the transactions are not supported by processor 101. Alternative code paths may also involve executing critical sections while holding locks. For example, the program may attempt to execute a lock-protected critical section using the transaction without acquiring a lock for the critical section. If the transaction fails, the program may acquire the lock to facilitate the successful execution of the critical section.

Furthermore, the setting and clearing of the misspeculation bit may be used to provide a wide range of feedback regarding the misspeculation indicator of a transaction failure. In particular, the misspeculation bit may be cleared once processor 101 determines that all branches associated with an executing transaction are correctly predicted, thus mitigating the occurrence of false positive indications of possible misspeculation in causing transaction failures.

Along the same lines, processor 101 may track speculative execution of a transaction along with a set of other factors that may influence the transaction's success or failure. Processor 101 may then set the misspeculation bit only if misspeculation is responsible for the failed transaction (e.g., a mispredicted branch indirectly causes a conflicting memory access) but not if another factor may be responsible for the failed transaction (e.g., a conflicting memory access is made prior to branch prediction). In other words, processor 101 may set the misspeculation bit if misspeculation is a likely source of the transaction failure instead of a possible source of the transaction failure.

Those skilled in the art will appreciate that information regarding the misspeculation indicator of transactional execution may be provided by processors 101-102 in a variety of ways. For example, the misspeculation indicator of an executing transaction may be stored as a misspeculation bit in a different register and/or written to main memory. Along the same lines, more than one bit of a register may be used to provide additional information regarding the transaction's misspeculation indicator. For example, multiple bits of a register may be used to indicate the type of speculation (e.g., value prediction, branch prediction, address prediction, etc.) associated with the transaction and/or a set of branches predicted during execution of the transaction.

Those skilled in the art will also appreciate that the functionality of processors 101-102 may be used in a number of software-visible speculation mechanisms. For example, CPS registers 123-126 may be used to provide feedback regarding non-transactional speculative execution of the program. The feedback may correspond to performance counters and/or samplers that indicate how often a speculative episode may have failed due to possible misspeculation. The program may then use the feedback to improve performance and/or diagnose the causes of a lack of improved performance in speculative execution.

Similarly, CPS registers 123-126 may be used in traditional lock-based synchronization instead of transactional execution. For example, caches, TLBs, branch predictors, and/or other components associated with processors 101-102 may be initialized and/or warmed up prior to acquiring a lock. CPS registers 123-126 may thus be used to provide feedback regarding misspeculation during the warm-up process.

Figure 2:
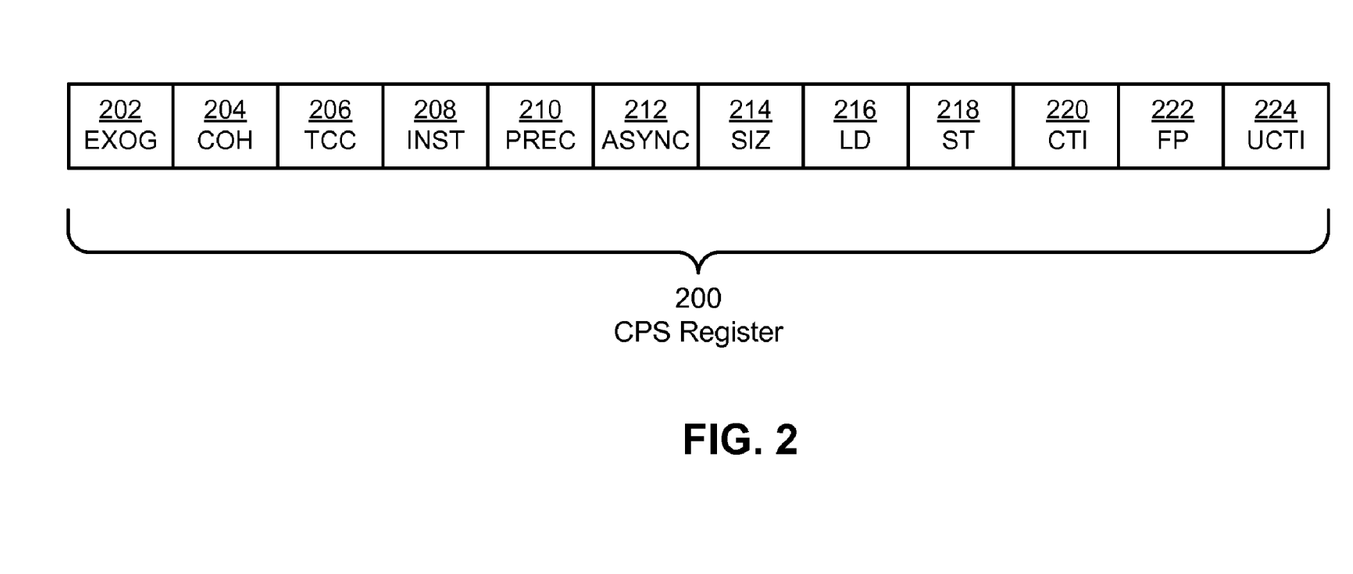
FIG. 2 shows a CPS register in accordance with an embodiment.

FIG. 2 shows a CPS register 200 in accordance with an embodiment. As described above, CPS register 200 may be used to provide feedback regarding the causes of a transaction failure. CPS register 200 includes a number of bits 202-224, with each bit providing information about a possible cause of failure in a transaction. The contents of CPS register 200 may be provided to a program for which the transaction is executed to facilitate a response to the transaction failure by the program.

An EXOG bit 202 in CPS register 200 may indicate that intervening code has run and that the contents of CPS register 200 are invalid. For example, EXOG bit 202 may be set if a context switch occurs after the transaction failure but before the program is able to read CPS register 200. Similarly, a COH bit 204 may be used to indicate a conflicting memory operation (e.g., by a different thread) as the source of the transaction failure. As a result, a transaction failure with COH bit 204 set may prompt the program to retry the transaction.

A TCC bit 206 may indicate that a trap is taken, thus causing the transaction to fail. The trap may be included in the program to deliberately cause the transaction to fail under certain conditions specified in the trap instruction. Furthermore, the program may include specific mechanisms for handling the transaction failure if the transaction failure is caused by the trap. An INST bit 208 bit may represent the execution of an unsupported instruction inside the transaction. For example, function calls may not be supported in transactional execution. Consequently, the inclusion of a function call in the transaction may cause INST bit 208 to be set.

A PREC bit 210 may indicate the occurrence of a precise exception during the transaction. For example, PREC bit 210 may be set if an instruction translation lookaside buffer (ITLB) miss, a divide-by-zero error, and/or a software trap occur during the transaction. Next, an ASYNC bit 212 may be set if an asynchronous interrupt occurs during the transaction. For example, the asynchronous interrupt may cause the transaction to fail by triggering a context switch and executing an interrupt handler before the transaction completes.

A SIZ bit 214 may indicate that the write set of the transaction has exceeded the capacity of a hardware resource. For example, SIZ bit 214 may be set if too many instructions are deferred due to cache misses. On the other hand, an LD bit 216 may represent an eviction of a cache line in the transaction's read set by the transaction. In other words, LD bit 216 may be set if the transaction performs too many loads to fit into the L1 cache. An ST bit 218 may represent a TLB miss; as discussed above, a failed transaction with ST bit 218 set may require a TLB mapping to be made to correct the TLB miss prior to retrying the transaction.

A CTI bit 220 and UCTI bit 224 may indicate failures related to misspeculation. In particular, CTI bit 220 may be set if a branch is mispredicted, while UCTI bit 224 may be set if a load on which a branch depends is not yet resolved. In other words, UCTI bit 224 may correspond to a misspeculation bit in CPS register 200 that indicates the presence of a possible misspeculation during the transaction. As a result, the program may retry the transaction if UCTI bit 224 is set such that the load may be resolved when the branch is executed; the transaction may succeed if the branch was incorrectly predicted, or the transaction may fail with UCTI bit 224 cleared, suggesting that the transaction may have failed due to reasons other than misspeculation. Furthermore, if the branch prediction associated with UCTI bit 224 is determined to be correct before the transaction fails, UCTI bit 224 may be cleared. On the other hand, if the branch prediction is determined to be incorrect, CTI bit 220 may be set. The setting and clearing of UCTI bit 224 is described in further detail below with respect to FIG. 4.

Finally, an FP bit 222 may be set if a difficult instruction, such as floating-point division, is encountered. Because each bit represents a different potential source of failure, the program may react differently to different values of CPS register 200 upon encountering a transaction failure. For example, a transaction failure with INST bit 208 or SIZ bit 214 set may require the program to execute an alternative code path to bypass the transaction failure. A transaction failure with EXOG bit 202, COH bit 204, CTI bit 220, and/or UCTI bit 224 set may cause the program to retry the transaction one or more times, with or without pausing or performing a remedial action before each retry.

Those skilled in the art will appreciate that CPS register 200 may be configured to provide feedback regarding failed transactions in multiple ways. For example, CPS register 200 may include a set of advice bits that provide recommendations regarding the best response to a particular transaction failure. Advice-based feedback for transaction failures using CPS register 200 is described in a co-pending non-provisional application by the same inventors as the instant application and filed on the same day as the instant application entitled "Advice-Based Feedback for Transaction Failures," having Ser. No. 12/494,934, which is incorporated herein by reference.

Figure 3:
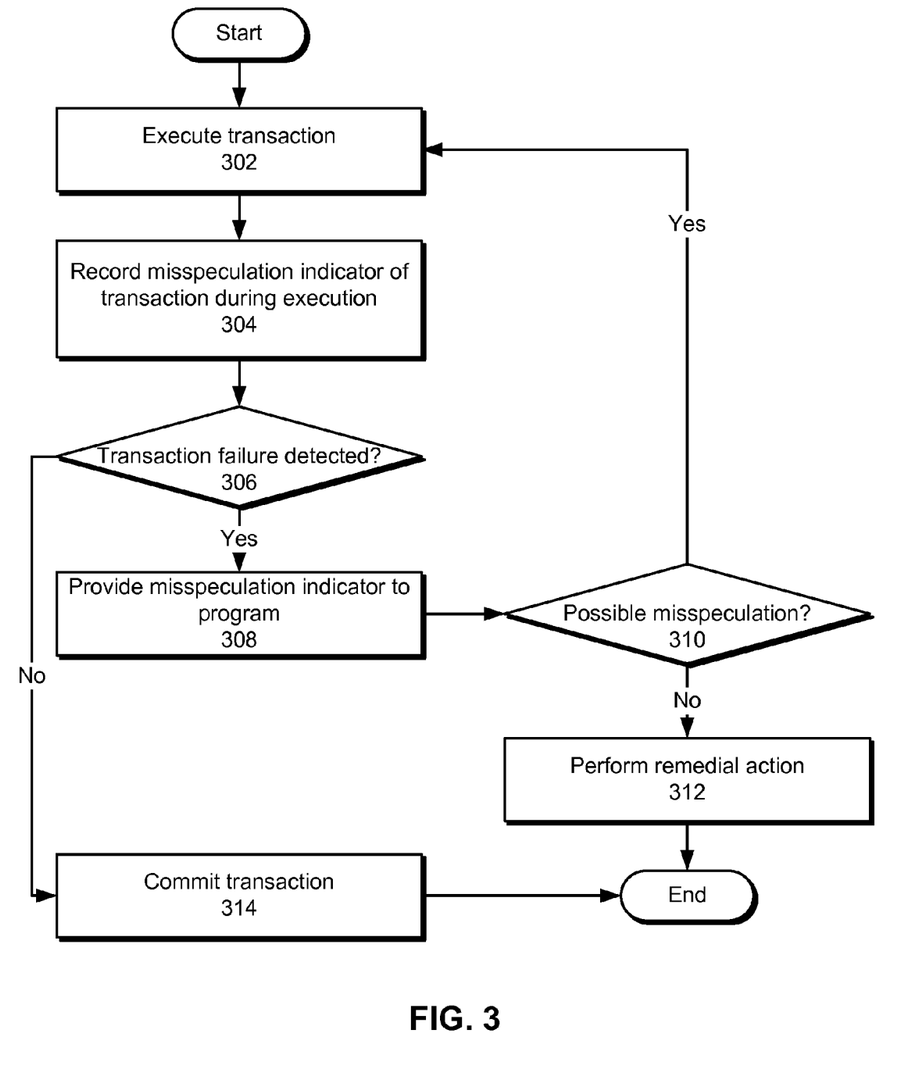
FIG. 3 shows a flowchart illustrating the process of facilitating the execution of a transaction in accordance with an embodiment.

FIG. 3 shows a flowchart illustrating the process of facilitating the execution of a transaction in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

First, the transaction is executed (operation 302) for a program in a hardware-supported transactional memory system. The hardware-supported transactional memory system may include a processor containing a storage apparatus and an execution mechanism for executing the transaction. Next, a misspeculation indicator of the transaction is recorded during execution of the transaction (operation 304) by the storage apparatus. The storage apparatus may correspond to a misspeculation bit in a CPS register associated with the program. In particular, the misspeculation bit may represent a possible misspeculation (e.g., execution of an incorrectly predicted branch due to an unresolved cache miss) associated with the transaction.

The CPS register may be used to provide feedback about the transaction if a transaction failure is detected (operation 306). If no transaction failure is detected, the transaction is committed (operation 314) to the architectural state of the processor. However, if a transaction failure is detected, the misspeculation indicator of the transaction is provided to the program (operation 308) to facilitate a response to the transaction failure by the program. In other words, the program may examine the contents of the CPS register to determine an appropriate response to the transaction failure.

The misspeculation indicator (e.g., misspeculation bit) may correspond to a possible misspeculation (operation 310) associated with the transaction. For example, the possible misspeculation may indicate the execution of an incorrectly predicted branch due to an unresolved cache miss during the transaction. If the misspeculation indicator of the transaction does not correspond to a possible misspeculation, a remedial action may be performed (operation 312). The remedial action may be based on one or more other bits set in the CPS register, as described above. For example, the remedial action may include retrying the transaction, addressing a non-conflict source of the transaction failure (e.g., TLB miss), and/or using an alternative code path to bypass the transaction failure.

If a possible misspeculation is indicated by the misspeculation indicator, the transaction is retried (operation 302) because the cache miss and possible misspeculation are likely to be resolved by the time the transaction is retried. During the retried execution of the transaction, the misspeculation indicator is again recorded (operation 304) to determine if the possible misspeculation is resolved. If the transaction succeeds, the previous transaction failure is likely due to the now-resolved misspeculation, and the transaction is committed (operation 314).

However, if the transaction continues to fail (operation 306), the misspeculation indicator is provided to the program (operation 308) and examined for possible misspeculation (operation 310). If possible misspeculation continues to be cited by the misspeculation indicator, the transaction may be re-executed (operation 302) and the misspeculation indicator recorded (operation 304) until the transaction is committed (operation 314). On the other hand, the transaction failure may be resolved to be a transaction failure that is not due to misspeculation (operations 306-310), and a remedial action may be used to respond to the transaction failure (operation 312).

Figure 4:
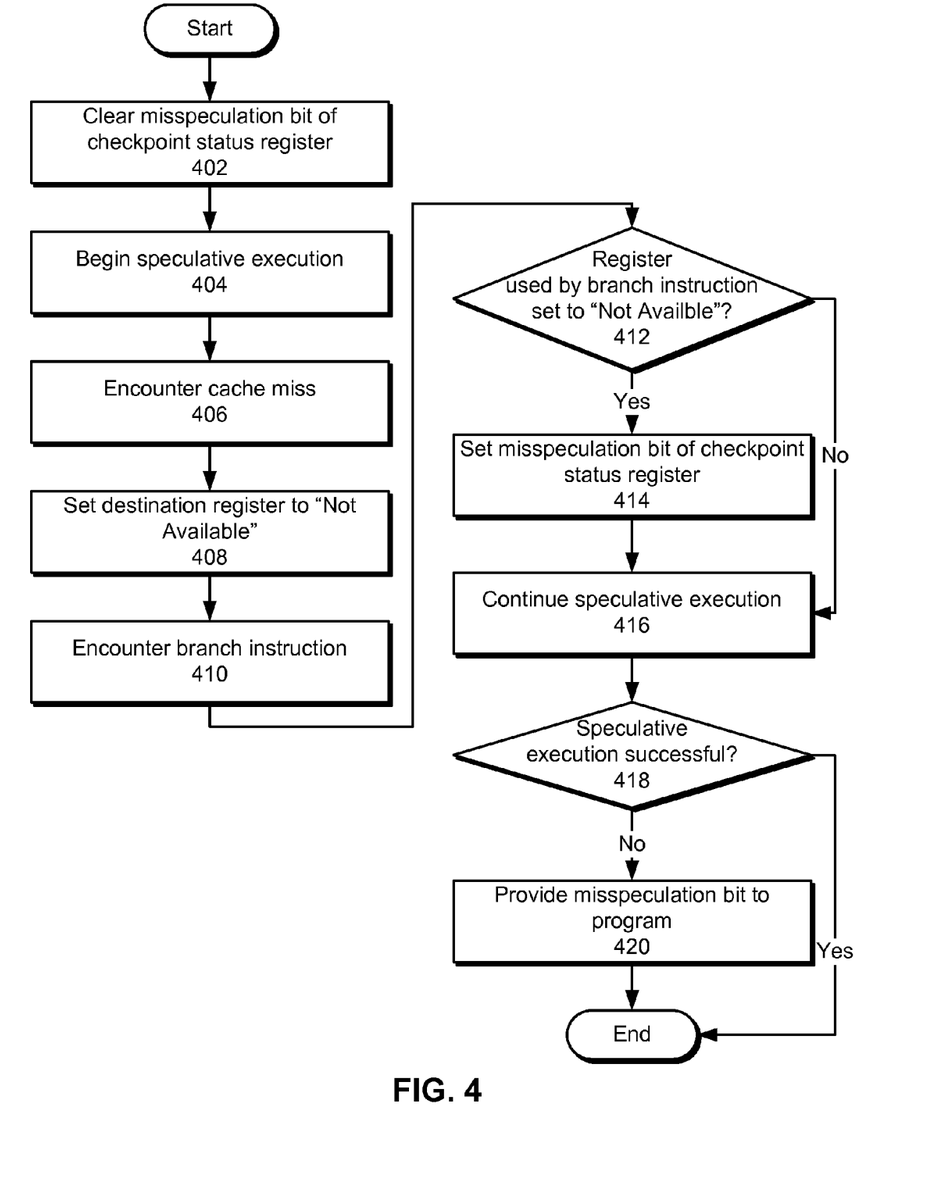
FIG. 4 shows a flowchart illustrating the process of updating a CPS register during a transaction in accordance with an embodiment.

FIG. 4 shows a flowchart illustrating the process of updating a CPS register during a transaction in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

Initially, a misspeculation bit (e.g., UCTI bit 224 of FIG. 2) of the CPS register is cleared (operation 402). As described above, the misspeculation bit may indicate the presence of possible misspeculation in executing a set of instructions for a program. Next, speculative execution is started (operation 404). The speculative execution may include branch prediction, address prediction, and/or value prediction.

Next, a cache miss is encountered (operation 402) during execution of a load instruction. Upon encountering the cache miss, the destination register of the instruction is set to a "Not Available" value representing the cache miss (operation 404). The "Not Available" value may denote the inability to obtain the value of the destination register due to the cache miss. After the register is set to the "Not Available" value, a branch instruction is encountered (operation 410) that may use the register (operation 412). If the branch instruction does not use a register that is set to the "Not Available" value, the speculative execution is continued. However, if the branch instruction does use a register that is set to the "Not Available" value, the misspeculation bit of the CPS register is set (operation 414) prior to continuing speculative execution (operation 416).

The speculative execution may or may not succeed (operation 418). If the speculative execution is successful, the transaction may continue until the transaction is committed or fails for reasons other than misspeculation. However, if the speculative execution does not succeed, the misspeculation bit is provided to the program (operation 420) to enable the program to handle a failed transaction that may be caused by possible misspeculation.

In one or more embodiments, the process of FIG. 4 is carried out in the context of an instruction pipeline of a processor (e.g., processors 101-102 of FIG. 1). If an instruction reaches a pipeline stage past which it cannot make progress due to one of its source registers being "Not Available", then the instruction may be placed in a deferred queue for subsequent execution. Some instructions that reach the "execute" pipeline stage when a source register contains "Not Available" must be deferred in this way. However, a branch instruction is not necessarily deferred; instead, it may be speculatively executed based on a prediction of the branch direction. In this case, the misspeculation bit may be set (operation 414), so that the program gets an indication of the possible misspeculation if the transaction aborts.

When the cache miss is resolved, the branch predicted from the cache miss may be determined to be correct. As a result, the misspeculation bit may be cleared before the transaction commits or fails to prevent false positives in misspeculation-induced transaction failures. If the branch prediction cannot be resolved before the transaction commits or fails, the misspeculation bit remains set, and the transaction may be retried until the cache miss is resolved.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the execution of a transaction for a program in a hardware-supported transactional memory system, comprising:
    recording a misspeculation indicator of the transaction during execution of the transaction using hardware transactional memory mechanisms, wherein recording the misspeculation indicator comprises recording in the misspeculation indicator that an instruction is executed based on a prediction made during the transaction due to unavailability of information required for the instruction;
    detecting a transaction failure associated with the transaction; and
    providing the recorded misspeculation indicator to the program to facilitate a response to the transaction failure by the program.

2. The computer-implemented method of claim 1, wherein the misspeculation indicator is used by the program to:
    retry the transaction if the misspeculation indicator corresponds to a possible misspeculation associated with the transaction; and
    perform a remedial action if the misspeculation indicator corresponds to an occurrence of the transaction failure without misspeculating.

3. The computer-implemented method of claim 2, wherein the remedial action involves at least one of:
    retrying the transaction;
    addressing a source of the transaction failure; and
    using an alternative code path to bypass the transaction failure.

4. The computer-implemented method of claim 3, wherein the source of the transaction failure corresponds to at least one of a trap instruction, an unsupported instruction, a precise exception, an asynchronous interrupt, an exceeded queue size, an evicted cache line, a floating point operation, and a translation lookaside buffer (TLB) miss.

5. The computer-implemented method of claim 3, wherein the alternative code path involves executing the transaction using software transactional execution mechanisms.

6. The computer-implemented method of claim 3, wherein the alternative code path involves executing a critical section while holding a lock.

7. The computer-implemented method of claim 1, wherein the possible misspeculation is associated with at least one of a value prediction, an address prediction, and a branch prediction.

8. The computer-implemented method of claim 1, wherein the misspeculation indicator is recorded as a misspeculation bit in a checkpoint status register associated with the program.

9. The computer-implemented method of claim 8, wherein the misspeculation bit is set if a predicted branch is executed during execution of the transaction.

10. The computer-implemented method of claim 9, wherein the misspeculation bit is subsequently cleared if the predicted branch is correctly predicted.

11. A system for facilitating the execution of a transaction for a program in a hardware-supported transactional memory system, comprising:
    a storage apparatus configured to record a misspeculation indicator of the transaction during execution of the transaction using hardware transactional memory mechanisms, wherein, when recording the misspeculation indicator, the storage apparatus is configured to record in the misspeculation indicator that an instruction is executed based on a prediction made during the transaction due to unavailability of information required for the instruction; and an execution mechanism within a processor, wherein the execution mechanism is configured to:

execute the transaction;

detect a transaction failure associated with the transaction; and provide the recorded misspeculation indicator to the program to facilitate a response to the transaction failure by the program.

12. The system of claim 11, wherein the misspeculation indicator is used by the program to:

retry the transaction if the misspeculation indicator corresponds to a possible misspeculation associated with the transaction; and perform a remedial action if the misspeculation indicator corresponds to an occurrence of the transaction failure without misspeculating.

13. The system of claim 12, wherein the remedial action involves at least one of:

retrying the transaction;

addressing a source of the transaction failure; and using an alternative code path to bypass the transaction failure.

14. The system of claim 13, wherein the source of the transaction failure corresponds to at least one of a trap instruction, an unsupported instruction, a precise exception, an asynchronous interrupt, an exceeded queue size, an evicted cache line, a floating point operation, and a translation lookaside buffer (TLB) miss.

15. The system of claim 13, wherein the alternative code path involves executing the transaction using software transactional execution mechanisms.

16. The system of claim 13, wherein the alternative code path involves executing a critical section while holding a leek lock.

17. The system of claim 11, wherein the possible misspeculation is associated with at least one of a value prediction, an address prediction, and a branch prediction.

18. The system of claim 11, wherein the misspeculation indicator is recorded as a misspeculation bit in a checkpoint status register associated with the program.

19. The system of claim 18, wherein the misspeculation bit is set if a predicted branch is executed during execution of the transaction.

20. The system of claim 19, wherein the misspeculation bit is subsequently cleared if the predicted branch is correctly predicted.

* * * * *

UNITED STATES PATENT AND TRADEMARK OFFICE
CERTIFICATE OF CORRECTION

PATENT NO. : 8,225,139 B2
APPLICATION NO. : 12/493447
DATED : July 17, 2012
INVENTOR(S) : Daniel S. Nussbaum et al.

It is certified that error appears in the above-identified patent and that said Letters Patent is hereby corrected as shown below:

In claim 16 (at column 14, line 11), please delete the word "leek".

Signed and Sealed this
Twenty-fifth Day of September, 2012

David J. Kappos
*Director of the United States Patent and Trademark Office*